(12) United States Patent
Afra (10) Patent No.: US 8,858,263 B2
(45) Date of Patent: Oct. 14, 2014

(54) SERVICE OVER ETHERNET INTERCONNECTABLE WALL PLATE (SOEICWP) MODULE

(75) Inventor: Bamdad Afra, Thornhill (CA)

(73) Assignee: Novano Corporation (CA)

( * ) Notice: Subject to any disclaimer, the term of this patent is extended or adjusted under 35 U.S.C. 154(b) by 0 days.

(21) Appl. No.: 14/234,373

(22) PCT Filed: Aug. 8, 2011

(86) PCT No.: PCT/CA2011/000895
§ 371 (c)(1),
(2), (4) Date: Jan. 22, 2014

(87) PCT Pub. No.: WO2013/020199
PCT Pub. Date: Feb. 14, 2013

(65) Prior Publication Data
US 2014/0179165 A1    Jun. 26, 2014

(51) Int. Cl.
*H01R 13/66* (2006.01)
*H04L 12/413* (2006.01)

(52) U.S. Cl.
CPC ............ *H01R 13/665* (2013.01); *H04L 12/413* (2013.01)
USPC .................................................... 439/620.21

(58) Field of Classification Search
CPC ..... H01R 13/665; H01R 13/66; H04L 12/413
USPC .................................................... 439/620.21
See application file for complete search history.

(56) References Cited

U.S. PATENT DOCUMENTS

| | | |
|---|---|---|
| 562,633 A | 6/1896 | Mailloux |
| 564,443 A | 7/1896 | Mezger |
| 1,881,801 A | 10/1932 | Mathes |
| 2,424,554 A | 7/1947 | Cornu |
| 2,876,390 A | 3/1959 | Sanders, Jr. |
| 3,185,760 A | 5/1965 | Despard |
| 3,289,170 A | 11/1966 | Currey et al. |
| 3,323,112 A | 5/1967 | Haselwood |
| 3,405,393 A | 10/1968 | Haselwood |
| 3,456,242 A | 7/1969 | Lubkin et al. |
| 3,496,293 A | 2/1970 | Avery et al. |
| 3,639,904 A | 2/1972 | Arulpragasam |
| 3,731,002 A | 5/1973 | Pierce |
| 3,749,845 A | 7/1973 | Fraser |
| 3,769,525 A | 10/1973 | Foss et al. |
| 3,796,835 A | 3/1974 | Closs et al. |
| 3,954,320 A | 5/1976 | Hardesty |
| 3,979,733 A | 9/1976 | Fraser |
| 3,988,545 A | 10/1976 | Kuemmerle et al. |
| 4,046,449 A | 9/1977 | Ranzanigo |

(Continued)

*Primary Examiner* — Javaid Nasri (57) ABSTRACT

A Service over Ethernet InterConnectable Wall Plate (SoE-ICWP) module is installed over a standard in-wall junction box with its wall plate panel being equal or larger in size compared to a standard single-gang wall plate. SoEICWP module is comprised of electronic circuits implemented in limited space available behind the wall plate. SoEICWP module includes an Ethernet Switch allowing SoEICWP modules being interconnected with other SoEICWP modules, at least one connection on the wall plate panel, and at least two Ethernet connections in the in-wall junction box being inaccessible after installation. Connections on the wall plate panel provide Internet, telephone and/or TV services. Ethernet connections in the in-wall junction box deliver mentioned services to the SoEICWP module. Ethernet connections in the in-wall junction box provide a permanent connection with SoEICWP modules and/or other network devices installed within a radius of 100 meters.

12 Claims, 6 Drawing Sheets

(56) References Cited

U.S. PATENT DOCUMENTS

| | | | |
|---|---|---|---|
| 4,049,906 | A | 9/1977 | Hafner et al. |
| 4,063,220 | A | 12/1977 | Metcalfe et al. |
| 4,099,024 | A | 7/1978 | Boggs et al. |
| 4,168,400 | A | 9/1979 | de Couasnon et al. |
| 4,201,889 | A | 5/1980 | Lawrence et al. |
| 4,234,952 | A | 11/1980 | Gable et al. |
| 4,287,592 | A | 9/1981 | Paulish et al. |
| 4,314,367 | A | 2/1982 | Bakka et al. |
| 4,417,334 | A | 11/1983 | Gunderson et al. |
| 4,479,228 | A | 10/1984 | Crane |
| 4,491,945 | A | 1/1985 | Turner |
| 4,517,637 | A | 5/1985 | Cassell |
| 4,655,529 | A | 4/1987 | Yokoyama |
| 4,674,085 | A | 6/1987 | Aranguren et al. |
| 4,717,358 | A | 1/1988 | Chaundy |
| 4,756,695 | A | 7/1988 | Lane et al. |
| 4,803,485 | A | 2/1989 | Rypinski |
| 4,872,157 | A | 10/1989 | Hemmady et al. |
| 4,872,160 | A | 10/1989 | Hemmady et al. |
| 4,875,223 | A | 10/1989 | Curtis |
| 4,875,880 | A | 10/1989 | Welch et al. |
| 4,894,024 | A | 1/1990 | Debortoli et al. |
| 5,121,382 | A | 6/1992 | Yang et al. |
| 5,180,886 | A | 1/1993 | Dierenbach et al. |
| 5,228,869 | A | 7/1993 | Below |
| 5,251,203 | A | 10/1993 | Thompson |
| 5,436,617 | A | 7/1995 | Adams et al. |
| 5,599,190 | A | 2/1997 | Willette |
| 5,599,206 | A | 2/1997 | Slack et al. |
| 5,658,166 | A | 8/1997 | Freeman et al. |
| 5,695,361 | A | 12/1997 | Elisei |
| 5,784,559 | A | 7/1998 | Frazier et al. |
| 5,895,888 | A | 4/1999 | Arenas et al. |
| 6,052,683 | A | 4/2000 | Irwin |
| 6,109,959 | A | 8/2000 | Burlinson et al. |
| 6,114,632 | A | 9/2000 | Planas, Sr. et al. |
| 6,123,577 | A | 9/2000 | Contois |
| 6,162,077 | A | 12/2000 | Laes et al. |
| 6,192,399 | B1 | 2/2001 | Goodman |
| 6,420,964 | B1 | 7/2002 | Nishikawa et al. |
| 6,457,874 | B1 | 10/2002 | Clapp, Jr. et al. |
| 6,543,940 | B2 | 4/2003 | Chu |
| 6,549,616 | B1 | 4/2003 | Binder |
| 6,587,454 | B1 | 7/2003 | Lamb |
| 6,601,097 | B1 | 7/2003 | Cheston et al. |
| 6,611,537 | B1 * | 8/2003 | Edens et al. .................. 370/503 |
| 6,690,677 | B1 | 2/2004 | Binder |
| 6,757,368 | B2 | 6/2004 | Binder |
| 6,880,020 | B1 | 4/2005 | Rubinstein et al. |
| 6,970,538 | B2 | 11/2005 | Binder |
| 7,123,701 | B2 | 10/2006 | Binder |
| 7,187,695 | B2 | 3/2007 | Binder |
| 7,188,190 | B1 | 3/2007 | Kojima et al. |
| 7,256,704 | B2 | 8/2007 | Yoon et al. |
| 7,299,287 | B1 | 11/2007 | Rubinstein et al. |
| 7,436,842 | B2 | 10/2008 | Binder |
| 7,453,895 | B2 | 11/2008 | Binder |
| 7,463,732 | B1 | 12/2008 | Hiscock et al. |
| 7,522,615 | B2 | 4/2009 | Binder |
| 7,522,714 | B2 | 4/2009 | Binder |
| 7,542,554 | B2 | 6/2009 | Binder |
| 7,612,653 | B2 | 11/2009 | Miller et al. |
| 7,680,255 | B2 | 3/2010 | Binder |
| 7,686,653 | B2 | 3/2010 | Binder |
| 7,688,841 | B2 | 3/2010 | Binder |
| 7,690,949 | B2 | 4/2010 | Binder |
| 7,715,534 | B2 | 5/2010 | Binder |
| 7,762,852 | B2 | 7/2010 | Daly et al. |
| 7,769,030 | B2 | 8/2010 | Binder |
| 7,860,084 | B2 | 12/2010 | Binder |
| 7,867,035 | B2 | 1/2011 | Binder |
| 7,873,058 | B2 | 1/2011 | Binder |
| 7,873,062 | B2 | 1/2011 | Binder |
| 7,889,720 | B2 | 2/2011 | Binder |
| 7,911,992 | B2 | 3/2011 | Binder |
| 7,953,071 | B2 | 5/2011 | Binder |
| 7,965,735 | B2 | 6/2011 | Binder |
| 7,986,708 | B2 | 7/2011 | Binder |
| 7,990,908 | B2 | 8/2011 | Binder |
| 8,092,258 | B2 | 1/2012 | Binder |
| 8,158,883 | B2 | 4/2012 | Soffer |
| 8,295,185 | B2 | 10/2012 | Binder |
| 8,360,810 | B2 | 1/2013 | Binder |
| 8,363,797 | B2 | 1/2013 | Binder |
| 8,472,593 | B2 | 6/2013 | Binder |
| 2003/0179868 | A1 | 9/2003 | Binder |
| 2004/0125819 | A1 | 7/2004 | Binder |
| 2004/0165616 | A1 | 8/2004 | Binder |
| 2004/0174647 | A1 | 9/2004 | Imamura |
| 2004/0175078 | A1 | 9/2004 | Imamura |
| 2005/0010954 | A1 | 1/2005 | Binder |
| 2005/0025162 | A1 | 2/2005 | Binder |
| 2005/0047431 | A1 | 3/2005 | Binder |
| 2005/0063403 | A1 | 3/2005 | Binder |
| 2005/0083959 | A1 | 4/2005 | Binder |
| 2006/0018339 | A1 | 1/2006 | Binder |
| 2006/0098638 | A1 | 5/2006 | Binder |
| 2006/0185876 | A1 | 8/2006 | Aviv |
| 2006/0185877 | A1 | 8/2006 | Soffer |
| 2006/0185878 | A1 | 8/2006 | Soffer |
| 2007/0019669 | A1 | 1/2007 | Binder |
| 2007/0041339 | A1 | 2/2007 | Binder |
| 2007/0041340 | A1 | 2/2007 | Binder |
| 2007/0147407 | A1 | 6/2007 | Binder |
| 2007/0254714 | A1 | 11/2007 | Martich et al. |
| 2007/0286232 | A1 | 12/2007 | Binder |
| 2008/0030971 | A1 | 2/2008 | Miller et al. |
| 2008/0134263 | A1 | 6/2008 | Binder |
| 2008/0175256 | A1 | 7/2008 | Binder |
| 2008/0198777 | A1 | 8/2008 | Binder |
| 2008/0205606 | A1 | 8/2008 | Binder |
| 2009/0046742 | A1 | 2/2009 | Binder |
| 2010/0103928 | A1 | 4/2010 | Binder |
| 2010/0157524 | A1 | 6/2010 | Soffer |
| 2010/0189098 | A1 | 7/2010 | Binder |
| 2011/0096778 | A1 | 4/2011 | Binder |
| 2011/0097939 | A1 | 4/2011 | Binder |
| 2011/0271125 | A1 | 11/2011 | Sivertsen |
| 2013/0173939 | A1 * | 7/2013 | Peto ............................. 713/300 |

\* cited by examiner

FIG. 1

A) TOP VIEW

B) SECTION "AA" VIEW

FIG. 2

TOP VIEW

SECTION "AA" VIEW

FRONT VIEW

FIG. 3

TOP VIEW

SECTION "AA" VIEW

FIG. 4

A) TOP VIEW

B) SECTION "AA" VIEW

FIG. 5

A) TOP VIEW

B) SECTION "AA" VIEW

FIG. 6

SERVICE OVER ETHERNET INTERCONNECTABLE WALL PLATE (SOEICWP) MODULE

FIELD OF INVENTION

In general, the present invention, Service over Ethernet InterConnectable Wall Plate (SoEICWP) module, is related to the field of data networking in Local Area Networks using Ethernet technology implemented with twisted pair Ethernet cable and deployed in buildings and/or apartment complexes.

BACKGROUND

Local Area Networks (LAN) are commonly used in order to connect Client devices (such as PCs and Laptops) with Server devices (such as routers) in order to provide network services (such as Internet access) to Client devices. The physical connection amongst network devices (Clients or Servers) are made using Network Switches. In a Local Area Network using Ethernet technology, each device (client or server) is generally connected to a Network Switch using an 8-wire twisted pair Ethernet cable (hereafter referred to as Ethernet cable).

Deploying a LAN inside a building entails connecting all network devices to Network Switches usually situated in a Central Location (such as a telephone room) using Ethernet cables. However, this is often unfeasible as discussed below.

In order to deploy a LAN in an apartment complex, the process of installing cables between each apartment unit and the Central Location entails meeting following requirements:
- A1) There is sufficient available space in cable routing channels and/or conduits for passing cables in the building.
- A2) All apartment units are connectable to the Central Location; with the length of each cable (connecting a given unit to the Central Location) being less than 100 meters (as imposed by Ethernet technology capabilities and standards).
- A3) There is sufficient space in Central Location.

The following discussion includes an example which demonstrates a typical situation in which using SoEICWP modules would make it possible to deploy Ethernet based LAN in an apartment complex. In this example, the LAN deployment without SoEICWP modules is initially discussed.

In a typical 15 to 20 story apartment complex with 300 to 400 apartment units (approximately 20 units per floor), the central telephone room (i.e. the Central Location where Network Switches would be placed) is situated in the basement of apartment complex. In such a building, the maximum horizontal distance between the Central Location (i.e. central telephone room) to each unit may be in the range of 50 to 80 meters while the maximum vertical distance may be in the range of 50 to 60 meters. Cable routing channels and/or conduits are generally placed vertically in the building from top floor to the basement at which point they are routed horizontally towards the Central Location. Each of the above mentioned requirements (A1 to A3) are discussed in following points (B1 to B3) for deployment of LAN within such a building, respectively:
- B1) In a 15 to 20 story apartment complex, a total of 15 to 20 Ethernet cables (proportional to the number of floors) would have to be placed inside existing cable routing channels and/or conduits. Such an amount of space is most often not available in existing buildings.
- B2) The distance between some apartment buildings on higher floors and/or furthest away from the center of the building can exceed 100 meters. In such a case, these apartment units would be excluded from being able to connect to the LAN in order to benefit from provided services.
- B3) A significant amount of physical space is required for installation and termination of 300 to 400 Ethernet cables along with necessary number of Network switches in the Central Location in order to form a LAN by connecting all Ethernet cables to Network Switches. This required space may be prohibitive in certain apartment complexes.

The above mentioned points (B1 to B3) generally demonstrate unfeasibility of LAN deployment in an apartment complex. Furthermore, for given dimensions of the building in the above example, an average cable length of 60 meters per apartment unit is required. In other words, 18 to 24 kilometers of Ethernet cable would be required to connect all apartment units to the Central Location. This would also entail a significant cost.

Introduced Advantages and Improvements by the Invention:

The present invention, SoEICWP module, addresses the above mentioned requirements (A1 to A3) by providing solutions to points of unfeasibility (B1 to B3) mentioned above for deployment of LAN in apartment complexes.

Telephone terminals inside apartment units in apartment complexes generally use single-gang in-wall junction boxes. SoEICWP module is designed to be mounted over such a junction box. Each SoEICWP module includes an integrated Network Switch and can accept a number of Ethernet connections. From these Ethernet connections, at least two Ethernet connections are in-wall connections (and are not accessible after the SoEICWP module is installed over the in-wall junction box). These connections can be used to connect the SoEICWP module to neighboring SoEICWP modules and/or network devices using in-wall cable routing channels and/or conduits. The SoEICWP module generally provides at least one Ethernet connection through the wall plate. This connection provides access to the LAN in the apartment unit.

Using SoEICWP module in-wall Ethernet connections, multiple SoEICWP modules can be inter-connected in various configurations. A typical configuration for such an interconnection is a chained connection in which each SoEICWP is generally connected to two other modules (for example to the SoEICWP module in the apartment unit one floor above and to the SoEICWP module in the apartment unit one floor below). When installed in all apartment units inside a complex, a single Ethernet cable (independent of the number of floors in an apartment complex) and a single Power Supply cable are passed through each cable routing channel and/or conduit. In such a configuration, only SoEICWP modules in the first floor are directly connected to the Central Location. As a result, the length of installed cables in addition to the number of cables arriving in the Central Location is significantly reduced.

Considering the above mentioned requirements (A1~A3), the feasibility of SoEICWP modules for deployment of LAN in an apartment complex is discussed within following points, respectively:
- C1) When SoEICWP modules are used, required space in cable routing channels is minimal and is equal to required space for one Ethernet cable and one Power Supply cable (which is not proportional to the number of floors).
- C2) As mentioned in the above example, the general horizontal distance between apartment units on the first floor and the Central Location is 50 to 80 meters. This implies that all units on the first floor can generally be connected to the Central Location as the cable length between each unit on the first floor and the Central Location is less than 100 meters. On the other hand, maximum distance between units on adjacent floors is 3 to 5 meters. As a result, when SoEICWP modules are used, all units in an apartment complex can be connected to the LAN in the apartment complex.

C3) When using SoEICWP modules, the number of Ethernet cables arriving to the Central Location is proportional to the number of apartment s in a given floor. For the above example, only 20 Ethernet cables would arrive in the central telephone (instead of 300 to 400 Ethernet cables mentioned in point 'B3' above). In such a case, the required physical space in the Central Location is significantly reduced.

Above mentioned points demonstrate the feasibility of LAN deployment in an apartment complex using SoEICWP modules. Furthermore, for the given dimension of the building in the above example, the required total amount of cable is in the range of 2 to 3 kilometers which entails a significant reduction (compared to the required amount of Ethernet cable discussed earlier for deployment of a conventional LAN in an apartment complex).

In brief, the present invention makes deployment of LAN more feasible in apartment complexes by significantly reducing physical space requirements for routing cables (in conduits) and facilities (in the Central Location).

This reduction in physical space is achieved by distributing the Network Switch functionality for Ethernet networks in the Central Location over the entire building using SoEICWP modules. The SoEICWP module implements a Network Switch in the limited space available behind the Wall Plate panel which is mountable over a single-gang in-wall junction box.

SUMMARY OF THE INVENTION

In brief, the present invention is the specific implementation of a Network Switch with optional additional functionality in a small form factor module such that:

a) The module is mountable over a single-gang in-wall junction box.

b) The module has a post installation thickness of at most 20 mm measured from the wall surface (on which the module is mounted on).

c) The module generally provides at least one Ethernet connection on the wall plate d) The module can include functionality for telephone/TV services (carried over Ethernet) providing corresponding connections on the wall plate.

This module can significantly reduce the number of Ethernet cables installed inside a building and arriving at a Central Location. Also, it can effectively reach apartment units which are more than 100 meters away from the Central Location.

In addition to advantages and improvement not discussed here, the present invention introduces significant reductions in physical space requirements for deployment of Local Area Networks in apartment complexes; thereby, making it more economically feasible to deploy such networks. Detailed description of the invention is discussed below.

BRIEF DESCRIPTION OF DRAWINGS

A brief description of drawings follows. It must be noted that each figure includes multiple views of a given item or items. All figures include a Top View. All figures specify an "AA" cutting plane using a dashed line with two double dots in their Top View drawings. This line has two arrows with letter 'A' at each end. The "AA" cutting plane specifies the plane at which the Section "AA" View in each figure is provided. In all figures, when applicable, dashed lines (without double dots) are representative of hidden edges. It must be noted that hidden edges are only shown in certain cases; when considered necessary.

DETAILED DESCRIPTION

The Service over Ethernet InterConnectable Wall Plate (SoEICWP) module uses Ethernet technology which is a networking technology for Local Area Networks (LAN) standardized in IEEE 802.3 standard. SoEICWP modules are interconnected using Twisted-pair Ethernet cables (such as cables known as Cat 5, Cat 5e and Cat 6) which often include 4 pairs of twisted-pairs (8 conductor wires). SoEICWP modules may be designed for various Ethernet over twisted pair technologies such as 100BASE-TX (for 100 Mbps) and 1000BASE-T (for 1000 Mbps) Ethernet connections. The type of twisted pair cable is dictated by the choice of Ethernet technology for which SoEICWP modules are designed for. The Network Switch integrated circuits used in SoEICWP electronic circuits is also dictated by the choice of Ethernet technology for which SoEICWP module is designed for.

Figure 1:
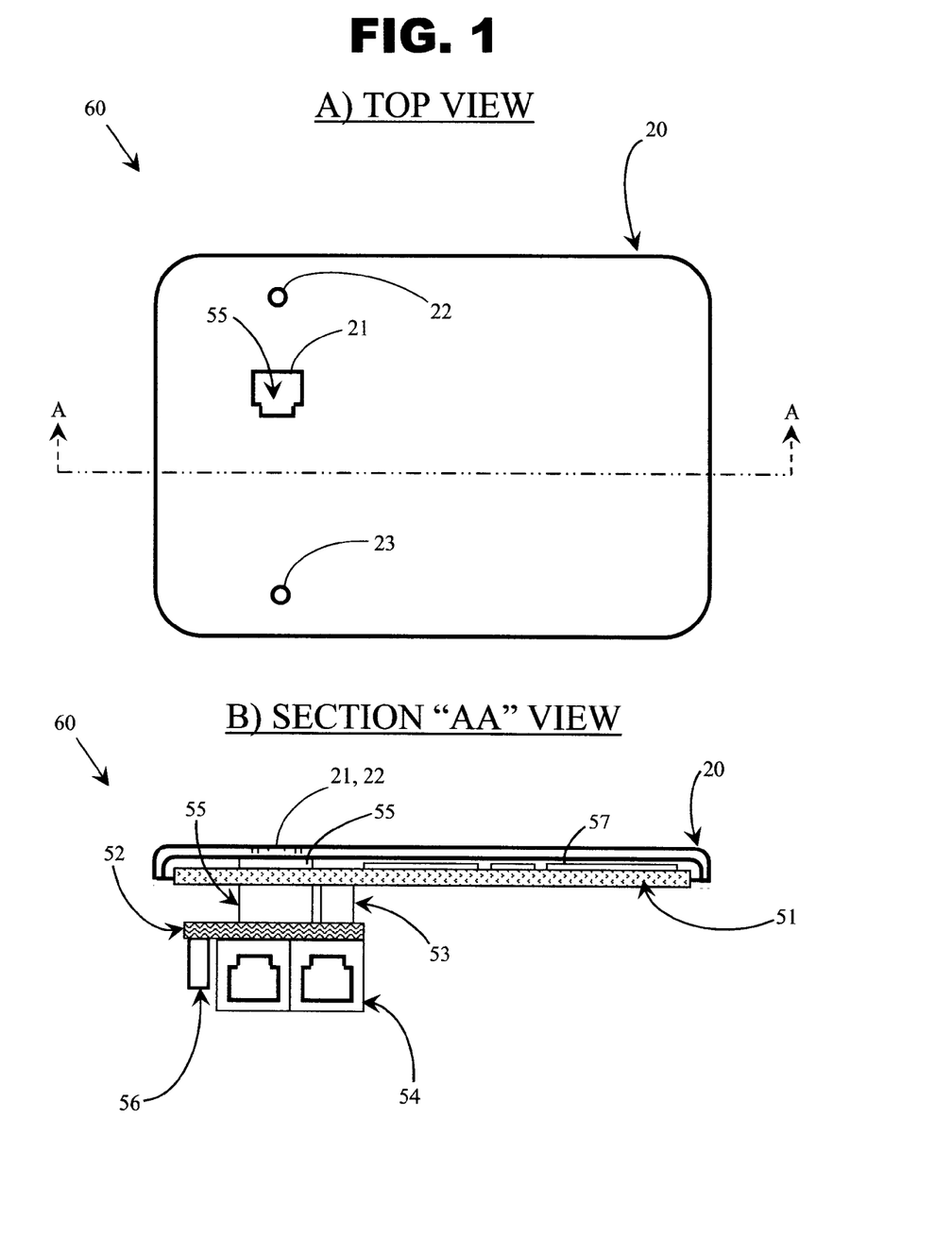
FIG. 1 shows the invention: the Service over Ethernet InterConnectable Wall Plate (SoEICWP) module. The chosen implementation shown in this and other figures has 3 Ethernet connections in total. This particular implementation includes one wall plate Ethernet connection (visible in the Top View drawing) and two in-wall Ethernet connections (visible in the Section "AA" drawings).

FIG. 1, being representative of the invention, shows the Service over Ethernet InterConnectable Wall Plate (SoEICWP) module 60 including its electronic circuits covered with the wall plate 20. The wall plate 20 includes an Ethernet connection opening 21 which provides access to the wall plate Ethernet connection 55 provided by electronic circuits. The wall plate 20 also includes holes 22 and 23 for installation screws allowing the SoEICWP module to be fastened to the wall. The SoEICWP module 60 electronic circuits are visible in FIG. 1 Section view. These electronic circuits include printed circuit board 51 and printed circuit board 52. The printed circuit board 51 includes the majority of active electronic circuit components (such as 57); especially heat generating components for heat dissipation through the wall plate 20. Printed circuit board 52 is the mounting platform for various connections: wall plate Ethernet connection 55, two in-wall Ethernet connections 54, and power supply connections 56. Two printed circuit boards 51 and 52 are connected using the board-to-board connector 53. A heat conducting polymer (not shown in the figure) may also be used to surround printed circuit board 51 for both efficient heat conduction to the wall plate and a physical buffer layer material between the wall and the printed circuit board 51. Moreover, a number of stands (not shown in the figure) may be used to fix two printed circuit boards together for mechanical rigidity. Finally, a protective sheet (not shown in the figure) may cover printed circuit board 52 for additional protection.

Figure 2:
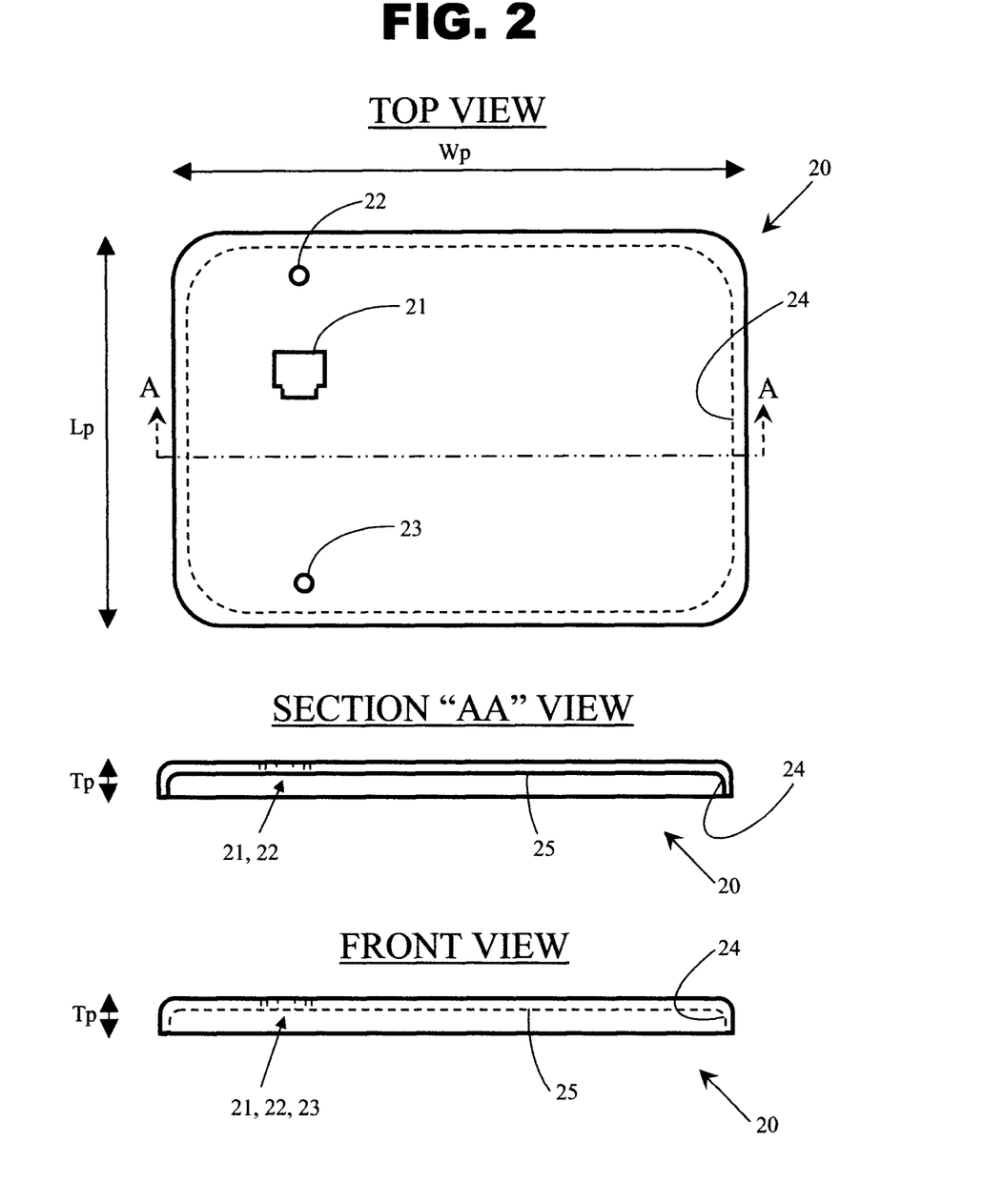
FIG. 2 shows a typical 3-gang wall plate from three different views. This wall plate has an opening appropriate for an Ethernet connection. A Front View is also provided in this figure.

FIG. 2 shows a typical 3-gang wall plate 20 which makes up the cover of the SoEICWP module with Width Wp generally in the range of 160 mm to 170 mm; with Length Lp generally in the range of 110 mm to 120 mm; and with Thickness Tp generally in the range of 2 mm to 20 mm. It must be noted that SoEICWP module wall plate Wp and/or Lp dimensions may be smaller or larger than these values depending on integrated functionality in a specific design. The wall plate 20 inner surfaces (such as surface 24 and surface 25) surround an inner available space inside the wall plate housing a portion of electronic circuits (such as printed circuit board 51). As mentioned earlier, the wall plate 20 includes an Ethernet connection opening 21 in addition to holes 22 and 23 for installation screws. Although wall plate 20 material may be metallic or plastic, a metallic material (preferably an aluminum alloy) is required for a great degree of heat conduction (from SoEICWP module 60 to the surrounding air). The wall plate surface may be structured (not shown in the figure) in order to increase the surface area and heat transfer efficiency from the wall plate to the surrounding air.

Figure 3:
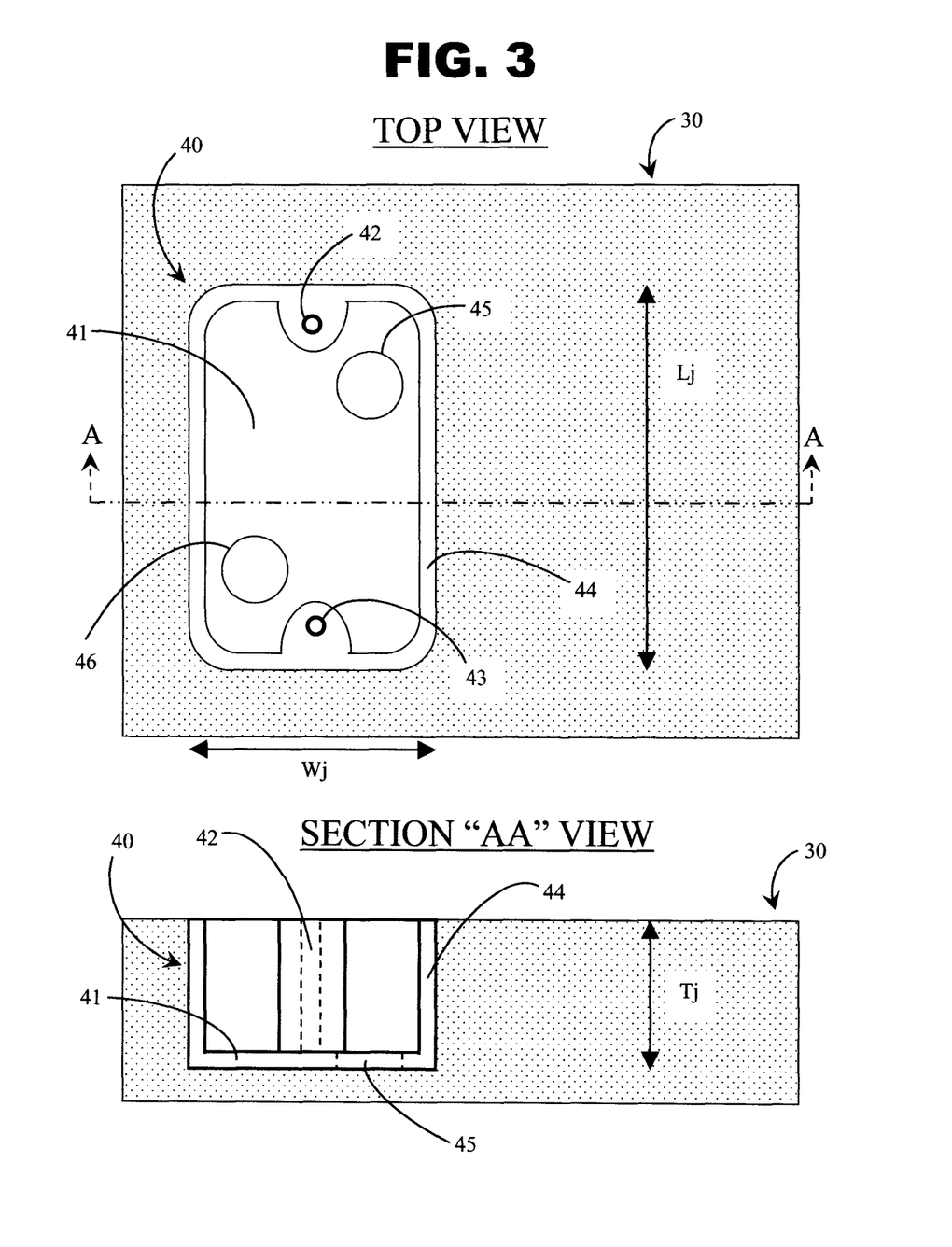
FIG. 3 shows a typical single-gang in-wall junction box in the installed state inside a wall.

FIG. 3 shows a standard single-gang in-wall junction box 40 installed inside the wall 30. The single-gang in-wall junction box has a Width Wj generally in the range of 65 mm to 80 mm; a Length Lj generally in the range of 110 mm to 120 mm; and a Thickness Tj generally in the range of 45 mm to 60 mm. The standard single-gang in-wall junction box 40 inner volume is mostly separated from the wall 30 by junction box bottom sheet 41 and junction box wall sheets 44. In-wall junction box allows entry of cables from cable channels and conduits inside the wall. These cables (not shown in the figure) can enter the in-wall junction box through pre-fabricated holes in the in-wall junction box, in this case, holes 45 and 46. The in-wall junction box also includes holes 42 and 43 in which wall-plate installation screws may be fastened.

Figure 4:
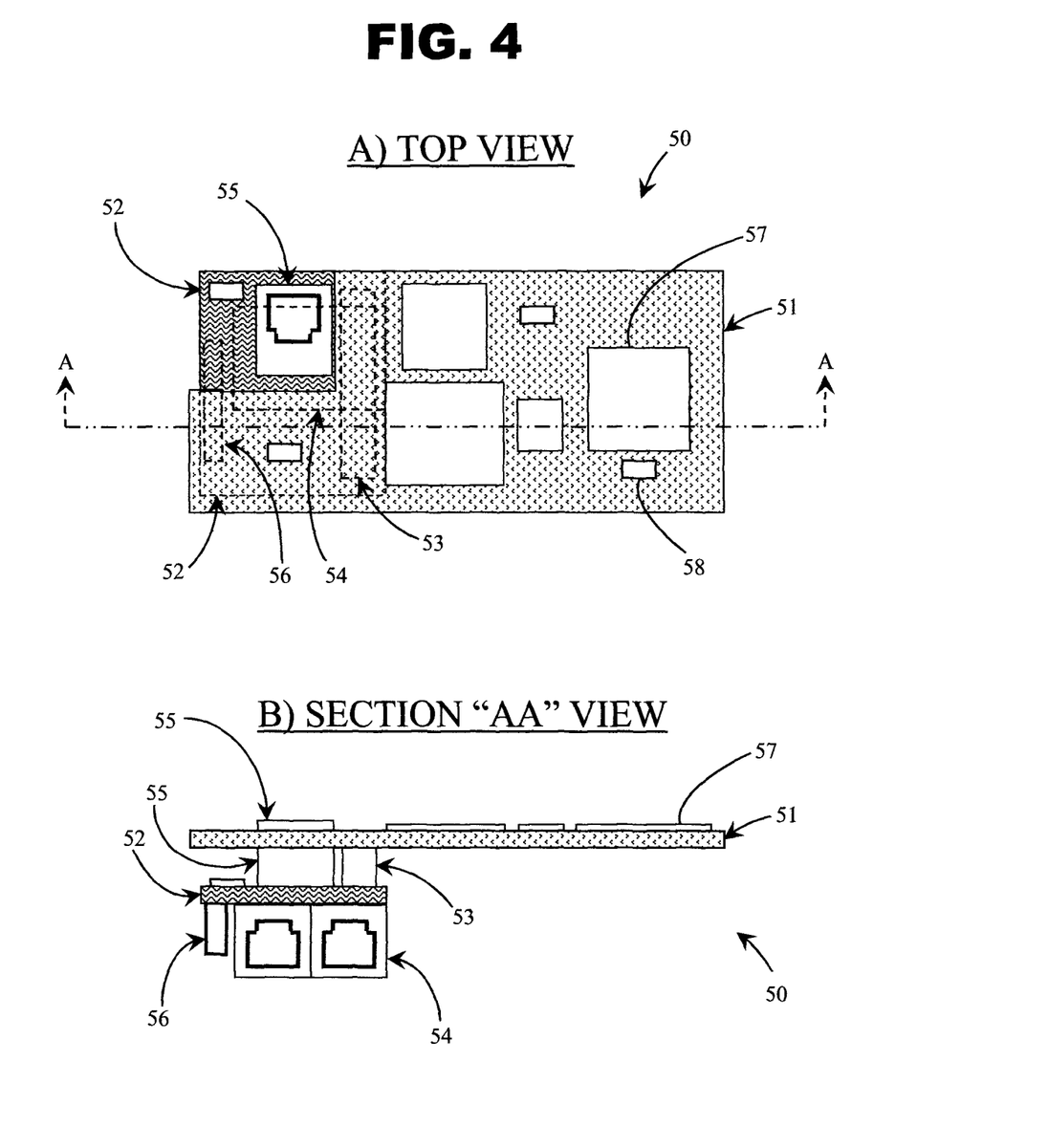
FIG. 4 shows electronic circuits to be installed in the space confined by the wall plate, the wall, and in-wall junction box. These circuits have three Ethernet connections. Two in-wall Ethernet connections (situated side-by-side) are accessible inside the junction box. A third Ethernet connection is provided for the wall-plate.

FIG. 4 shows electronic circuits 50 used for the SoEICWP module 60. These electronic circuits may be implemented using one or multiple printed circuit boards. FIG. 4 shows an implementation with two printed circuit boards 51 and 52. These electronic circuits may include active components (such as 57) or passive components (such as 58). It must be noted that some components are intentionally left without a number. The printed circuit board 51 includes most active and/or heat generating components such that their generated heat is dissipated directly into the wall plate. Also, the printed circuit board 52 includes various connections such as the wall plate Ethernet connection 55, the in-wall Ethernet connections 54, power supply connections 56, in addition to any applicable active and/or passive components. The board-to-board connector 53 provides the means for interfacing printed circuit boards 51 and 52. As mentioned earlier, printed circuit boards may be fastened together using stands (not shown in the figure) for increased mechanical rigidity and/or protected using heat conducting polymer or protective sheet (also not shown in the figure).

Figure 5:
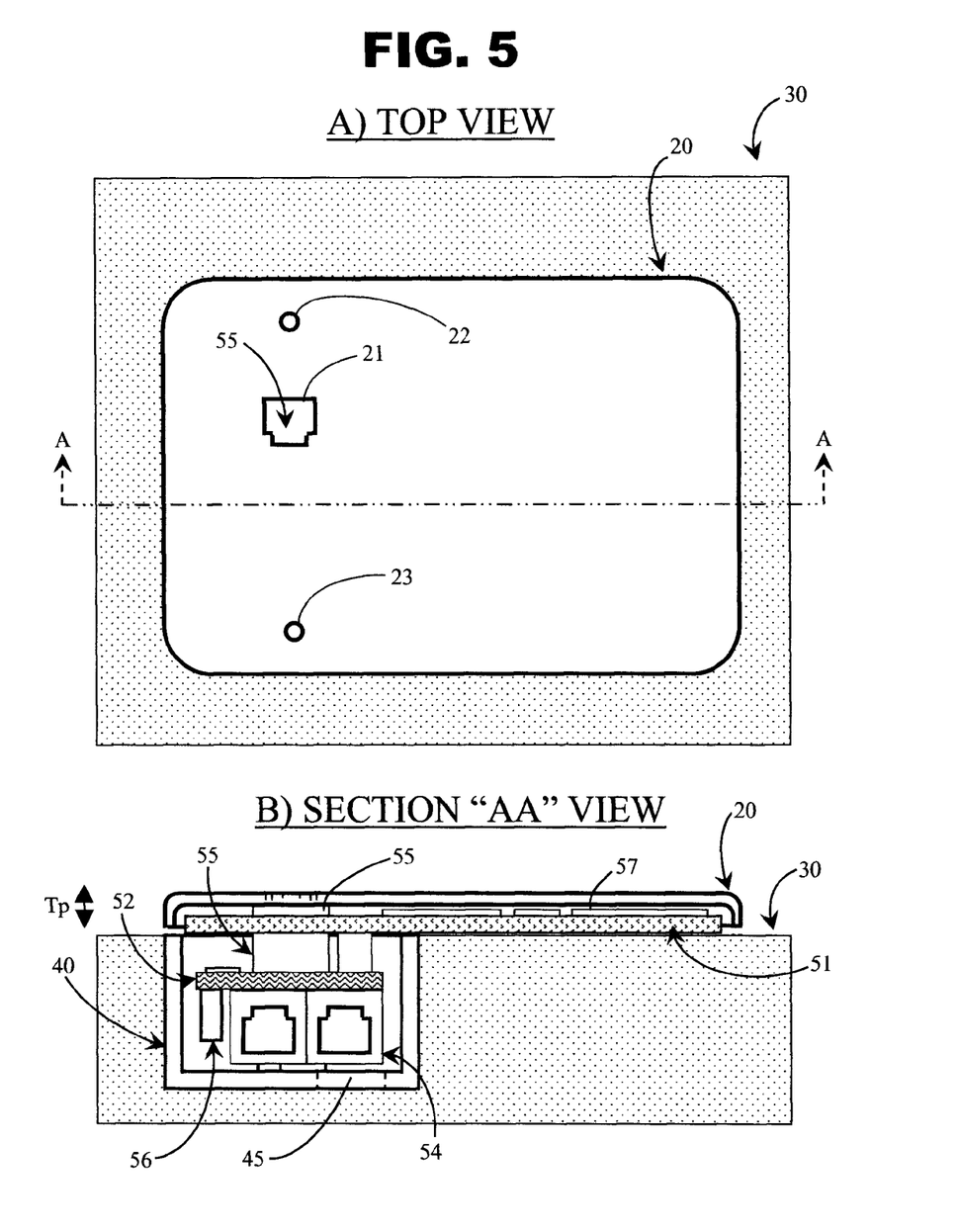
FIG. 5 shows electronic circuits (shown in FIG. 3) installed in the space confined by the wall plate, the wall, and in-wall junction box (such that electronic circuits are covered by the wall-plate; and in-wall Ethernet connections are situated inside the in-wall junction box).

FIG. 5 shows the wall plate 20, the wall 30, and the in-wall junction box 40 together forming the embodiment of electronic circuits 50.

Figure 6:
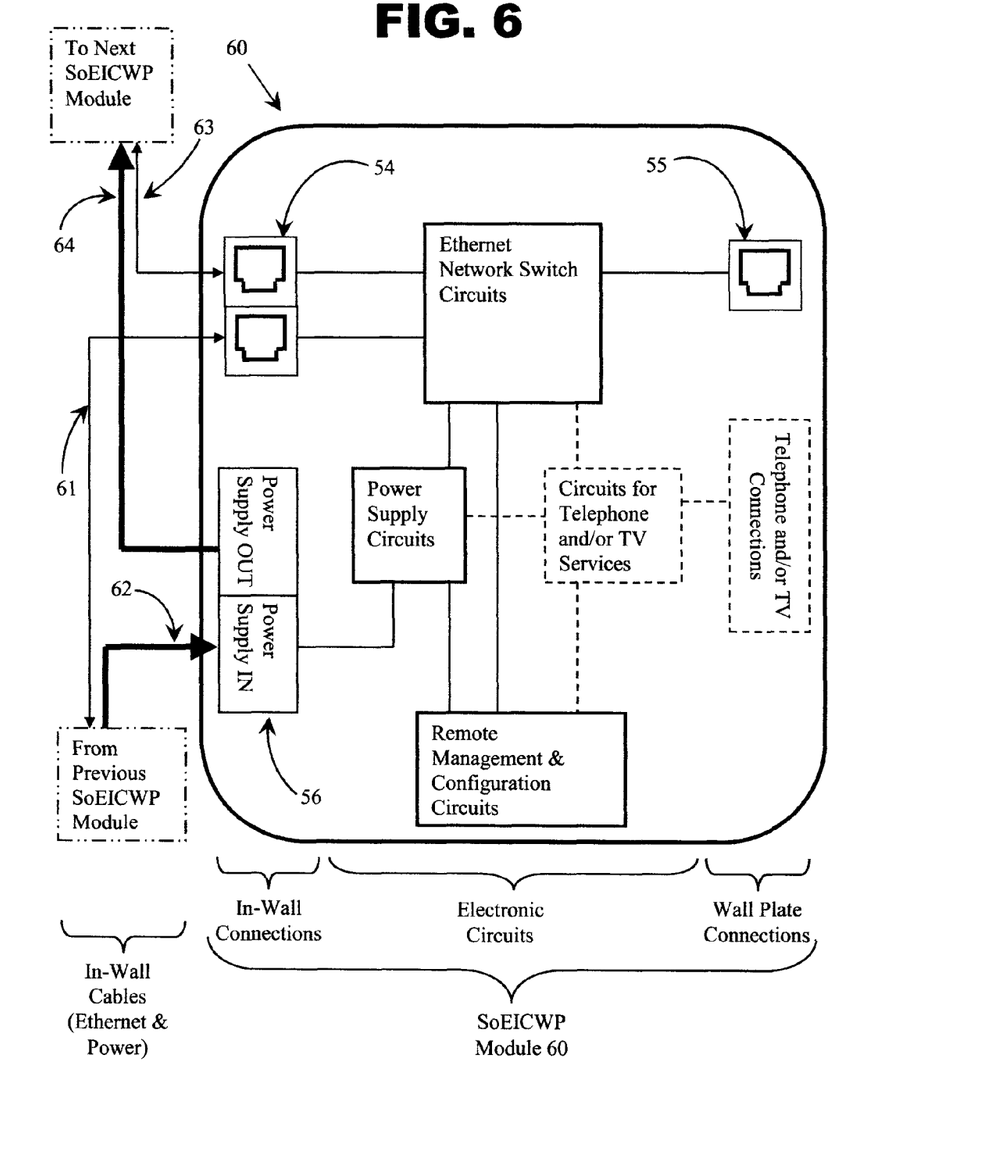
FIG. 6 shows functional blocks of electronic circuits of the invention and their interconnection in addition to various Ethernet and Power Supply connections. It also shows how SoEICWP modules are interconnected with other SoEICWP modules using in-wall connections, Ethernet cables and Power Supply cables.

FIG. 6 shows functional blocks of electronic circuits and various connections (such as in-wall Ethernet connection 54, wall plate Ethernet connection 55 and Power Supply connections 56) inside the SoEICWP module 60. This figure also shows how multiple SoEICWP modules may be interconnected using Ethernet cable 61, Ethernet cable 63, Power Supply cable 62 and Power Supply cable 64. Functional blocks implemented in SoEICWP module electronic circuits are Ethernet Network Switch circuits, Power Supply Circuits, and Remote Management & Configuration circuits. In SoEICWP module 60 shown in FIG. 6, functional blocks for Telephone and/or TV services are depicted using dashed lines as these functional blocks have been excluded from the particular implementation discussed herein; however they may be implemented when required. The SoEICWP module may be connected with other SoEICWP modules (residing in neighboring apartment units inside a building). In FIG. 6, the connection of a given SoEICWP module to a previous SoEICWP module in the interconnected chain is shown using Power Supply cable 62 and Ethernet cable 61; while the connection to the next SoEICWP module is shown using Power Supply cable 64 and Ethernet cable 63. In an earlier example, each SoEICWP module was connected to other modules in floors above and below forming a chain of SoEICWP modules from the first floor to the top floor of an apartment complex. For that example, assuming the SoEICWP module 60 in FIG. 6 is located on 6th floor of a building, then Ethernet cable 61 and Power Supply cable 62 would be arriving from previous SoEICWP module in the chain located on the 5th floor; while the Ethernet cable 63 and Power Supply cable 64 would be connected to the next SoEICWP module in the chain located on the 7th floor of the apartment complex. In that example, the SoEICWP module for the unit on the top floor would only be connected to one SoEICWP module one floor below it; while the SoEICWP module in the first floor would be connected to a standard Network Switch in the Central Location in the building. The main power supply for all SoEICWP modules insides a building is also situated in the Central Location. This power supply uses voltages less than 48 volts for supplying power to SoEICWP modules inside the building.

It will be appreciated that this invention, SoEICWP module, uses limited amount of space available behind a wall plate in order to implement an Ethernet Network Switch. This invention considers the heat dissipation of such a circuit, power supply design, remote management, and configuration in order to provide an Ethernet connection on the wall plate within a design constrained by the wall plate form factor. Using the space behind the wall plate has several advantages such as ease of heat dissipation through the wall plate (provided its material is chosen correctly) and, also, obtaining a slim design with a form-factor similar to a conventional wall plate. Using a remote power supply in the central room with a voltage less than 48 volts allows for providing non-lethal power to the SoEICWP modules compatible with telephone wire routing standards. As a result, cables for SoEICWP modules may be placed in telephone cable routing channels and/or conduits inside a building. Nevertheless, the ideal operating voltage for SoEICWP modules is considered to be approximately 12 volts as all integrated circuits used in SoE-ICWP module are expected to use voltage levels equal to or less than 5 volts.

It is foreseeable that in some cases the SoEICWP module will replace a wall plate which provides a telephone connection in a given apartment complex. In that case, assuming SoEICWP modules are being installed to provide Ethernet connection while sharing telephone cable routing channels and/or conduits; it is desired to provide a telephone connection along with the Ethernet connection on the wall plate. In other words, SoEICWP module provides Ethernet connection functionality but no telephone functionality; it only provides a pass-through connection for telephone connection (i.e. just wires and a standard connection). The Ethernet connection functionality is provided by electronic circuits in SoEICWP module; however, the telephone connection is not connected to electronic circuits in SoEICWP module. In this particular case, SoEICWP module only provides a physical connection between wires inside the in-wall junction box (inaccessible after installation) to the telephone connection on the wall plate. This configuration is not shown in any figures discussed herein. A similar connection may also be provided for a pass-through TV connection.

It was explained before that SoEICWP modules may be used in a chained configuration. In such a case, many Ethernet connections are provided in various units through SoEICWP modules wall plate connections. All these connections are physically situated on the same LAN. It will be appreciated that only one cable (connected to the in-wall connection of the first SoEICWP module in the chain) is required to be connected to a Network Switch in the Central Location in order to effectively connect all network devices connected to a chain of SoEICWP modules to the LAN.

In order to increase the fluidity of network traffic data between the SoEICWP modules, depending on the configuration and design, it may be required to assign a higher level of priority to network traffic on in-wall Ethernet connections compared to wall plate Ethernet connection on each SoEICWP module.

For security and network administration purposes, each SoEICWP module may be configured to have its in-wall connection placed on a unique Virtual LAN (VLAN).

The invention, SoEICWP module, described above includes many advantages and features making deployment of Ethernet networks in certain buildings and/or apartment complexes economically and/or practically feasible. This invention is mounted over a standard junction box with a form factor of a wall plate; allowing a wall plate to be replaced by the SoEICWP module when deploying an Ethernet network inside a building while sharing existing cable routing channels (such as those used for telephone). Deployment of Ethernet networks is often hindered by prohibitive cost of creating required physical space and routing channels for cable routing in existing buildings, allocating physical space and routing channels for cable routing in new buildings, and the maximum 100 m cable length for Ethernet. The Active Ethernet Wall Plate addresses all these issues and limitations while providing a platform to building owners and/or residents to deploy Ethernet network connectivity with various speeds such as 10, 100, and 1000 Mbps. Such network infrastructure may also be used to provide Internet, telephone, and/or TV services.

It will be appreciated that the invention, SoEICWP module, described above in the form factor of a wall plate installed over a standard in-wall junction box serves as an example which shows benefits of the described invention, and that those individuals with ordinary skill in the art may create their own designs or bring additional changes that implement principals of the invention described herein and be within the scope and spirit of this invention.

What is claimed is:

1. A wall plate module for providing network connectivity, Internet, telephone and/or TV services carried over Ethernet network comprising:
    a minimum of one user connection, user connections being accessible after wall plate module installation on a wall, user connections being Ethernet, telephone, and/or television;
    further comprising a plurality of internal Ethernet connections, each internal Ethernet connection being inaccessible after wall plate module installation on the wall, each internal Ethernet connection providing connectivity to another wall plate module or network device on the Ethernet network;
    further comprising at least one electronic circuit board with active components, electronic circuit board(s) designed to interface with internal Ethernet connections and some or all user connections.

2. The wall plate module of claim 1, further comprising at least one input and/or output power supply connection(s), each being inaccessible after wall plate module installation on the wall.

3. The wall plate module of claim 2, wherein the wall plate module is powered with power supply voltage of less than or equal to 480 volts.

4. The wall plate module of claim 3, wherein all or some portion of said electronic circuit board(s) is situated between the wall plate and a wall surface on which the wall plate module is installed.

5. The wall plate module of claim 4, wherein a portion of the wall plate surface of the said wall plate module is structured for maximizing area in contact with air.

6. The wall plate module of claim 4, wherein material of the wall plate of the wall plate module includes metallic and/or polymer materials.

7. The wall plate module of claim 6, further comprising at least one telephone connection being inaccessible after wall plate module installation on the wall.

8. The wall plate module of claim 6, further comprising at least one TV connection being inaccessible after wall plate module installation on the wall.

9. The wall plate module of claim 6, wherein said electronic circuits implement a Network Switch.

10. The wall plate module of claim 6, wherein the said wall plate module has a post installation thickness of at most 20 millimeters measured from the wall surface.

11. The wall plate module of claim 6, wherein the wall plate material of the said wall plate module is an aluminum alloy.

12. The wall plate module of claim 3, wherein all or some portion of said electronic circuit board(s) is situated inside the wall after installation.

* * * * *